United States Patent [19]

Lundgren

[11] Patent Number: 5,216,326
[45] Date of Patent: Jun. 1, 1993

[54] INJECTION MOLDED PRINTED CIRCUIT DEGAUSS COIL

[75] Inventor: David A. Lundgren, Kentfield, Calif.

[73] Assignee: Apple Computer, Inc., Cupertino, Calif.

[21] Appl. No.: 786,311

[22] Filed: Oct. 31, 1991

[51] Int. Cl.⁵ .............................................. H01F 13/00
[52] U.S. Cl. .......................................... 315/8; 361/150
[58] Field of Search ..................... 315/8, 85; 361/150; 335/284; 336/232

[56] References Cited

U.S. PATENT DOCUMENTS

| | | | |
|---|---|---|---|
| 4,313,151 | 1/1982 | Vranken | 336/232 |
| 4,313,152 | 1/1982 | Vranken | 336/232 |
| 4,359,707 | 11/1982 | Spannhake et al. | 361/150 X |
| 4,700,260 | 10/1987 | Craig et al. | 361/150 |
| 4,812,946 | 3/1989 | Prigent et al. | 361/150 |
| 4,963,789 | 10/1990 | Buhler | 315/8 |
| 5,038,078 | 8/1991 | Duggan | 315/8 |

FOREIGN PATENT DOCUMENTS

0148488  9/1982  Japan ..................... 315/8

Primary Examiner—Eugene R. LaRoche
Assistant Examiner—Son Dinh
Attorney, Agent, or Firm—Robert T. Martin

[57] ABSTRACT

An improved degauss coil for use with cathode ray display tubes is disclosed. The degauss coil is formed from conductive traces placed directly on to a plastic part attached to or adjacent the front bezel surrounding the cathode ray tube. Alternatively, the conductive traces may be placed directly on to the bezel itself. The invention allows for a very narrow bezel border surrounding the cathode ray tube.

10 Claims, 6 Drawing Sheets

_FIG 2A_

_FIG 2B_

THIN BEZEL BORDER, SINCE LESS DEGAUSS COIL CLEARANCE IS NEEDED; BETTER INDUSTRIAL DESIGN

FIG 8B

INJECTION MOLDED PRINTED CIRCUIT DEGAUSS COIL

BRIEF SUMMARY OF THE INVENTION

This invention relates to placing the conducting degauss coil for a color cathode ray tube (CRT) on a plastic part or substrate directly adjacent to the bezel of the tube supporting apparatus rather than anywhere on the tube itself. By placing the conducting coil traces directly adjacent to the inside of the CRT display bezel, the degaussing of the tube can be effected by state of the art processes of plating the coil traces.

BACKGROUND OF THE INVENTION

Color cathode ray tubes comprise a tube envelope with red, green, and blue phosphor dots on the screen, which emit the chosen color when impinged with a scanning electron beam within the tube. In order to ensure that the correct color dot is energized by the correct applied electron beam, the inside surface of the front of the cathode ray is covered with a shadow mask, (or other similar apparatus, such as an aperture grill plate), which is a metal plate with tiny openings, the metal plate being placed such that the openings are lined up with the color dots on the face of the tube. The shadow mask allows for accurate color reproduction and eliminates color scanning errors. However, the shadow mask plate is metallic and can be magnetized by the earth's magnetic field enough to cause errors to occur when the tube is moved, as when pivoted on a stand on a viewer's desk, for example.

Prior art techniques used to overcome the effects of the earth's magnetic field, or other stray magnetic fields, and improve the color purity of the CRT include using a degaussing coil around the cathode ray tube. When the degaussing coil is energized by a circuit within the device using the CRT, such as a computer, video monitor, or a television set, for example, a compensating magnetic field is produced which nullifies or otherwise negates the effect of the earth's magnetic field or other stray magnetic fields on the shadow mask. Some systems must be manually energized, and other systems energize the degaussing system periodically or upon start-up or initial turning on of the system in which the cathode ray tube is used.

Certain known prior art degaussing techniques are disclosed in U.S. Pat. No. 4,908,550, issued Mar. 13, 1990 to Elaine Chase. This patent discusses the need for degaussing coils, as well as suggesting certain degaussing solutions, such as varying the position of the deflection coil yoke along the CRT neck. Techniques disclosed in the Chase patent includes the use of two coils, near the CRT yoke, and another adjacent to the front of the CRT, but not adjacent the bezel, however.

According to the present invention, a spiral pattern of electrical traces is placed directly on to a plastic part or substrate attached to or adjacent the front bezel that surrounds the CRT. These traces would replace the prior art degaussing coils presently used to eliminate the effects of magnetic fields on the aperture grill or shadow mask of the CRT. The present invention allows the bezel borders on a color CRT display to be very narrow in comparison to the bezel normally needed for prior art CRTs using the bulky, unwieldy, and expensive degaussing cables that are difficult to install. Manufacturability is improved because the degaussing coil can be attached to the bezel, and to the rest of the monitor, with a one axis motion. A second embodiment includes plating the electrical traces directly on to the bezel itself.

DESCRIPTION OF THE DRAWINGS

For a more complete understanding of the invention, reference may be had to the following detailed description of the invention in conjunction with the drawings wherein.

DETAILED DESCRIPTION OF THE INVENTION

Figure 1A:
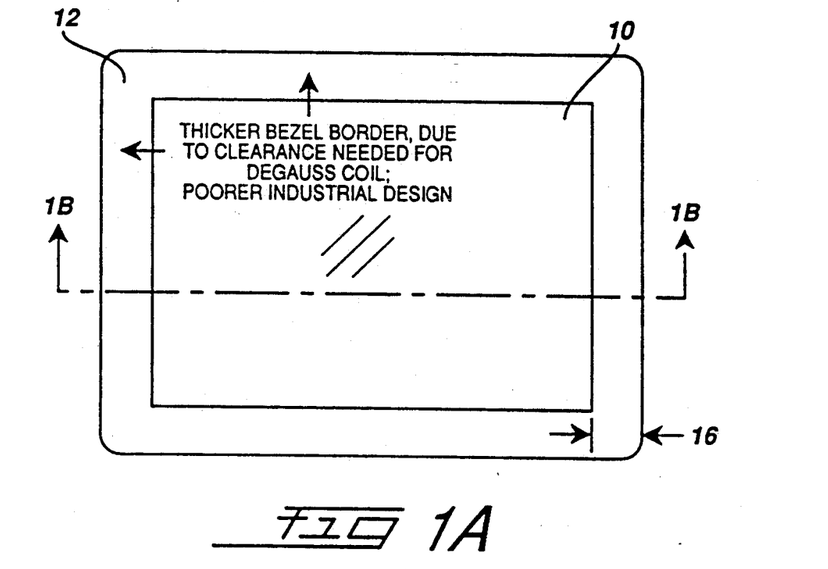
FIG. 1A and 1B are front and bottom views, respectively, of a prior art configuration of a degaussing coil comprising multiple turns of wire adjacent to the front of a CRT screen.
Figure 1B:
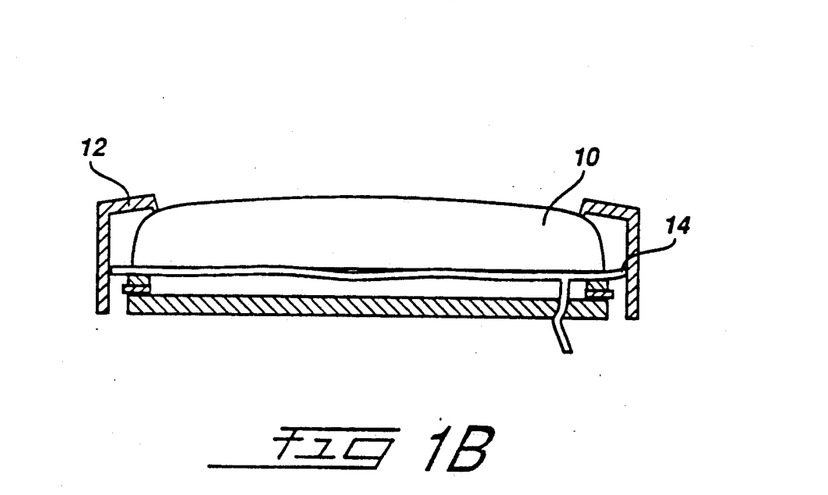

As set forth above, cathode ray tube (CRT) displays have problems with stray magnetism or the earth's own magnetism affecting the color purity of the screen display of the monitor. In order to eliminate the effects of these residual magnetic fields, a degauss coil can be used, as having been taught in the prior art. FIG. 1 of the present invention shows a cathode ray tube using the standard degauss coil known in the prior art. That is, cathode ray tube 10 in FIG. 1A and FIG. 1B are surrounded by the plastic bezel 12 as would exist in a standard display or color television set. Degauss coil 14 is shown mounted around the cathode ray tube immediately adjacent the front surface of the cathode ray tube 10 such that when the degauss coil is activated, either manually or upon startup, the magnetic fields generated by the degauss coil eliminate the residual magnetism, effects of stray magnetism, or the earth's magnetism, on the shadow mask (not shown) within the cathode ray tube envelope. Because of the number of windings necessary to have an effect on the shadow mask within the cathode ray tube, the degauss coil must be of such a size as to require a large clearance for the bezel to support the tube and the degauss coil. Seen in FIG. 1A is a dimension 16 which is required for the spacing of the bezel border necessitated by the large degauss coil for some of the larger cathode ray tube color screens such as 14 inch, 16 inch, or even larger.

One of the problems with prior art degauss coils is that sometimes they are relatively thick, in the order of 8 to 10 millimeters and they are bulky and awkward to install on the cathode ray tube. Prior art degauss coils can cost 10 dollars or more, depending on the size, and they are difficult to automate in the manufacturing and assembly process of the cathode ray tube display. As shown in FIG. 1, due to their bulk, degauss coils tend to make the border of the bezel around the CRT tube (the plastic around the glass envelope) somewhat wider than it would be otherwise. The extra space around the periphery of the cathode ray tube is necessary to accommodate the actual physical size of the degauss coil 14 itself.

Figure 2A:
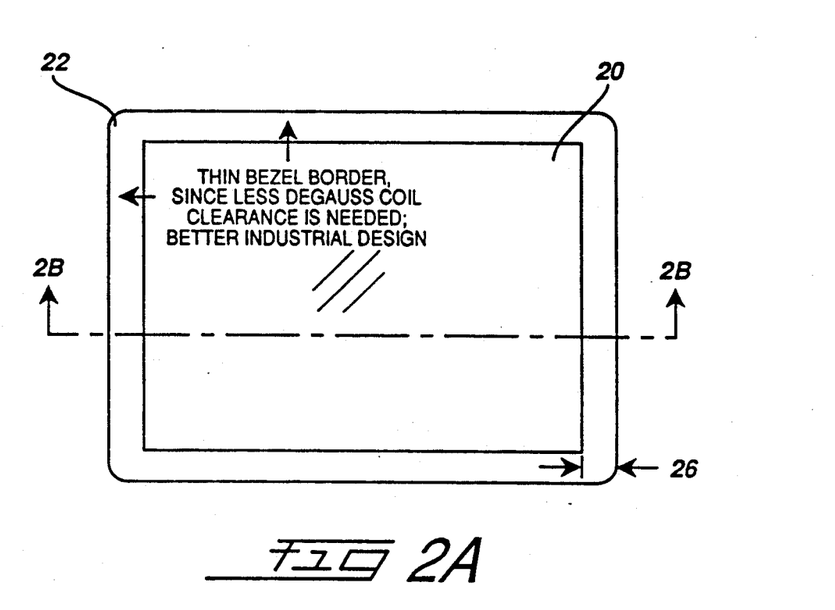
FIGS. 2A and 2B are front and bottom views, respectively, of an injection molded printed circuit degauss coil using the principles of the present invention.
Figure 2B:
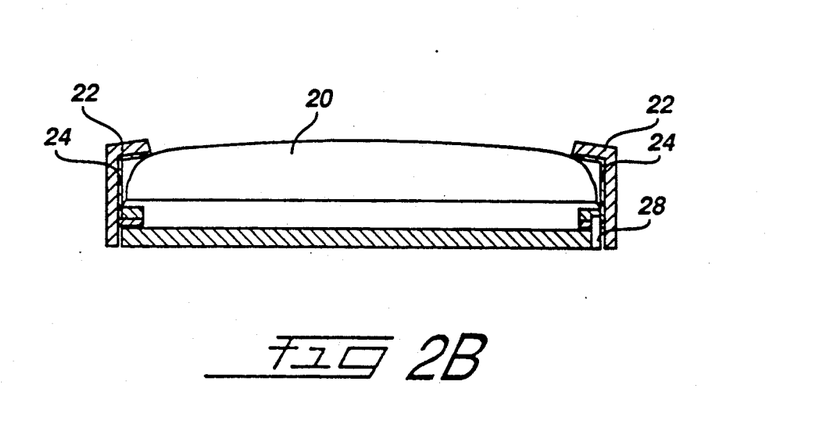

Turning to FIGS. 2A and 2B, cathode ray tube 20 is shown mounted in a bezel 22. However, instead of a degauss coil 14 with a separate lead to external circuitry 16 as seen in FIG. 1, FIG. 2B shows injection molded printed circuit degauss coil 24 which comprises conducting traces printed on a thin molded plastic part adjacent to the inner surface of the bezel display. The prior art degauss coil 14 in FIG. 1B necessitated a floppy end cable which must be manually connected to subsequent circuitry; while the invention described and shown in FIG. 2B allows for molded in and plated contacts 28 on the printed circuit degauss coil which allows for an automated assembly to complete the circuit from the degauss coil to the subsequent circuitry in the system. This injection molded printed circuit degauss coil comprises a continuous conducting loop of copper all the way around many times of the plastic part.

In operation alternating current is passed through the printed circuit traces which generates a magnetic field in the direction perpendicular to the CRT screen and shadow mask. When alternating current is used in the degauss coil, the field of the alternating current continually reverses into and out of the screen and thus essentially cleans up the screen by reducing any effects of the earth's magnetic field or an extraneous magnetic field on the shadow mask which could degrade the picture of the cathode ray tube display, as set forth earlier.

Figure 3A:
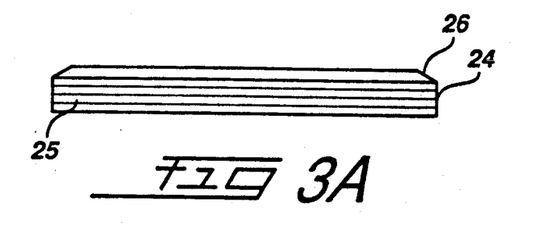
FIGS. 3A, 3B and 3C are top, back, and side views, respectively, of the plastic part or substrate upon which the spiral pattern of conducting traces has been plated.
Figure 3B:
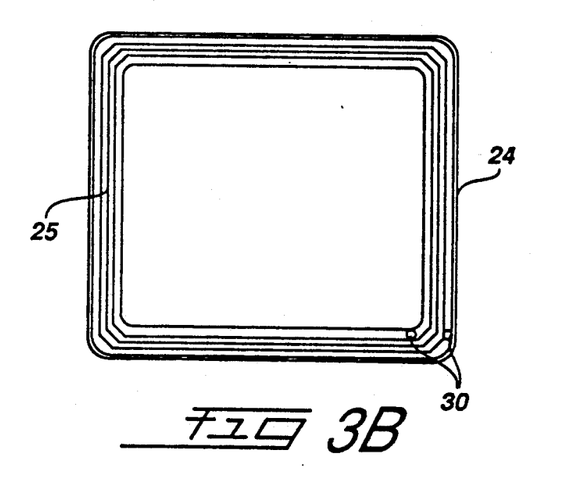
Figure 3C:
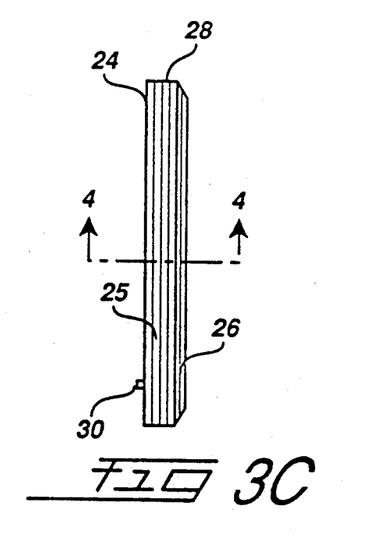

FIG. 3A shows the degauss coil 25 plated onto a plastic part 24 and 15 seen from the top edge thereof, as would be viewed by a viewer of the cathode ray tube itself. FIG. 3B shows the coil 25 as plated onto the plastic surface 24 and is viewed from behind, that is, out through the front of the cathode ray tube as viewed from the interior, say, of a cathode ray tube monitor. Seen in FIG. 3B is the spiral pattern of conducting traces 25. This pattern could be plated around all sides of the monitor if required, both on the inside and the outside surface of the plastic part 24. There would be many more traces than seen in FIG. 3A, 3B, or 3C, but only a few are shown for purposes of clarity. FIG. 3C is a right edge view of the plastic part 24 and is seen to comprise both the flat portion 26 and edge surfaces 28 so that the plated part 24 can fit snugly against a plastic bezel and also to maximize the amount of plated surface patterns that can be plated on to the surface of the plastic part. FIG. 3C shows the edge surface 28 and the face surface 26 and also the fact that the traces 25 cover the edge as well as the face surface of the printed circuit degauss coil on the plastic part. There would be at least one hundred traces in a single spiral, but, as set forth above, only a few are shown for purposes of clarity.

Figure 4:
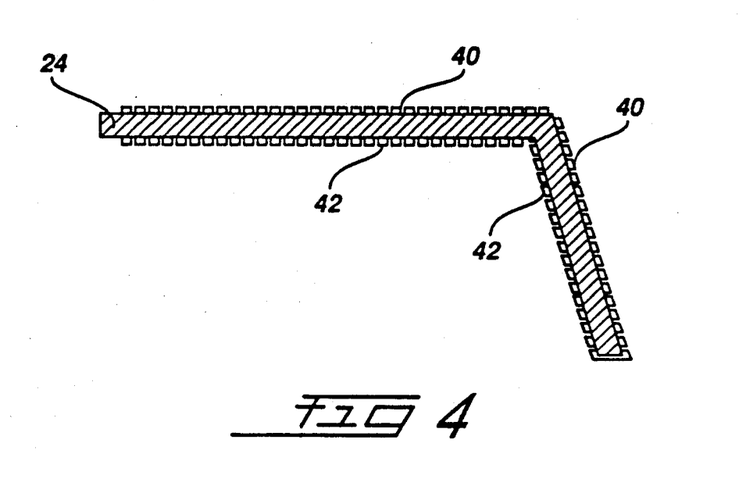
FIG. 4 is a section view A—A of FIG. 3C shown greatly enlarged to show the plated conductor traces on edge through the plastic part.

FIG. 4 shows one edge portion of the plastic part 24 shown and described above in conjunction with FIGS. 2A through FIG. 2C. Shown there in FIG. 3 is the plastic substrate 24 upon which has been plated the spiral conductor patterns 40 on the outside and 42 on the inside of the plastic substrate 24 in order to maximize the number of coils to generate a more substantial magnetic field through the plastic substrate and thus through the face of the cathode ray tube and the shadow mask adjacent the screen surface. The plated on conductors 40,42 could be, for example, 15 thousandths of a inch wide with 10 thousandths of an inch spacing between the traces. If the traces are narrower or closer together, then the cost of manufacture of the coil, at this time, becomes too high at the present level of the state of the art. The cross section A—A as seen in FIG. 3C and clearly shown in FIG. 4 depicts at least one hundred or more turns of a plated on conductor 40,42 in a spiral pattern. Generating a brief, one second, 60 cycle, 10 amp pulse, through the conductor 40,42, results in the generation of the alternating magnetic field and accomplishes the degaussing in the shadow mask of the screen adjacent to the plastic substrate 24.

The plated pattern on the plastic substrate 24, as seen in FIG. 4, could actually be plated directly on the surface of the plastic substrate 24, but it could also be plated within a spiral indent in the plastic substrate so that the copper conductor would be actually in the spiral pattern and thus is more immune to any inadvertent scratches that may occur during manufacture of the coil with the plated on conductors. Plating the copper conductor within a spiral indent allows a conductor of greater cross section area to be formed, when compared to a conductor plated directly on the surface. This greater cross section area allows higher currents to be passed through the conductor, resulting in a stronger magnetic field, and a more effective degaussing process.

Figure 5:
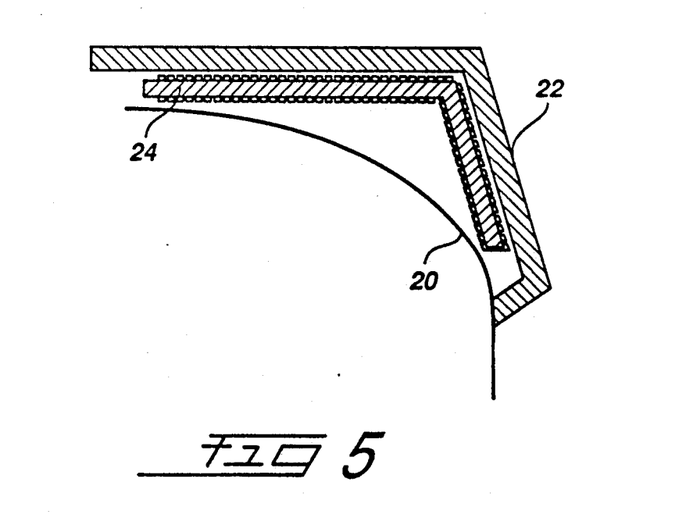
FIG. 5 is a section view of a cathode ray tube along with the bezel surrounding the front of the cathode ray tube with the injection molded printed circuit degaussing coil of the present invention in place on the bezel within the cathode ray tube display.

FIG. 5 shows the cathode ray tube 20 and the plastic bezel 22 as would be existing in any standard cathode ray tube monitor or television set. However, plastic substrate 24 is now seen to be in place adjacent the plastic bezel 22 and could be mounted there by any technique such as screws or snap in parts, which are readily available and known in the prior art. In this particular case, a snap in technique could be used in order to simplify manufacture where the plastic substrate 24 could be merely snapped into place in the bezel 22 and then the bezel mounted onto the cathode ray tube monitor as in a normal fashion.

Figure 6:
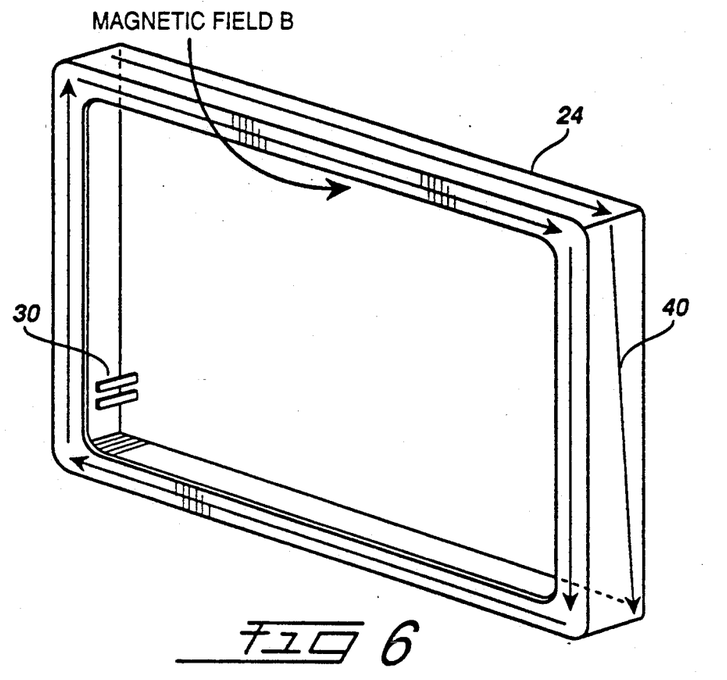
FIG. 6 is an isometric view of the plastic part viewed from the outside showing representative traces and the direction of the magnetic field into the cathode ray tube device.
Figure 7:
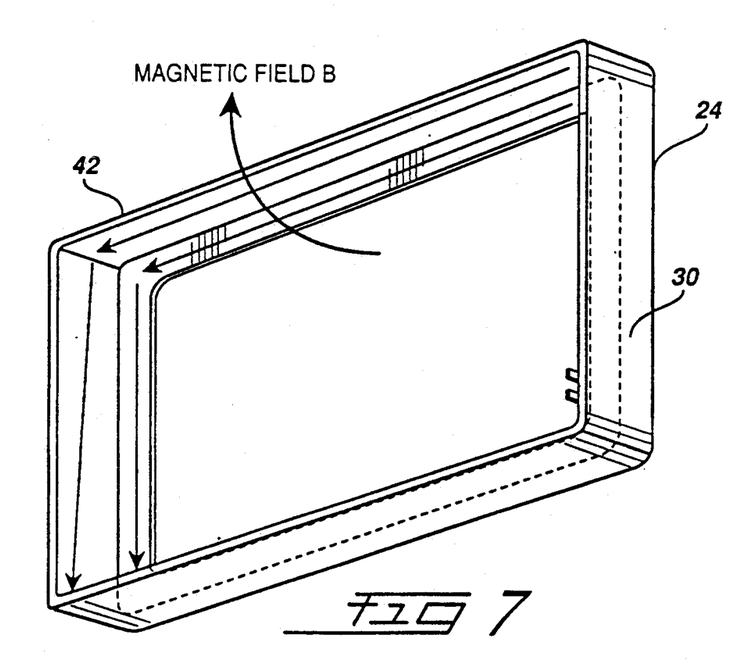
FIG. 7 is another view of the plastic part of the injection molded printed circuit degaussing coil viewed from the inside wherein the magnetic field is seen to be coming into the printed circuit degauss coil plastic part and (out of the paper)

FIG. 6 shows the plastic substrate 24 in FIGS. 4 and 5, but more clearly shown in FIG. 6 to show the direction of the specific plated patterns and the direction of current and direction of the magnetic field which is generated by the alternating current. If, for example, in FIG. 6, the current would be flowing in the direction of the arrows, a magnetic field would be generated such that the magnetic field would be in a clockwise direction if facing along the direction of the current flow or would be toward the inside of the coil or into the surface of the paper as viewed in FIG. 6. In FIG. 7, the substrate 24 is seen to be viewed from the inside and thus when the current is flowing in trace 42 in the direction shown, the alternating current would be from the paper toward the viewer in a clockwise direction. Thus, it is seen in FIGS. 6 and 7 that, using the standard right hand rule, the magnetic fields vary from going toward the user and away from the user thus demagnetizing the shadow mask within the cathode ray tube envelope.

Degaussing efficiency could possibly be increased by increasing the current of the applied signal or increasing the frequency of the degaussing signal itself. However, the normal 60 cycle signal at 120 volts, and 10 amps, for one second would normally be sufficient with the dimensions of the traces given above to successfully demagnetize the CRT shadow mask. Another feature of the plastic substrate as seen in the various Figures and clearly seen in FIGS. 6 and 7 are the molded in contact pins 30 to allow for attachment to circuitry away from the degaussing coil to apply signal and current to the degaussing coil on the plastic substrate 24.

Figure 8A:
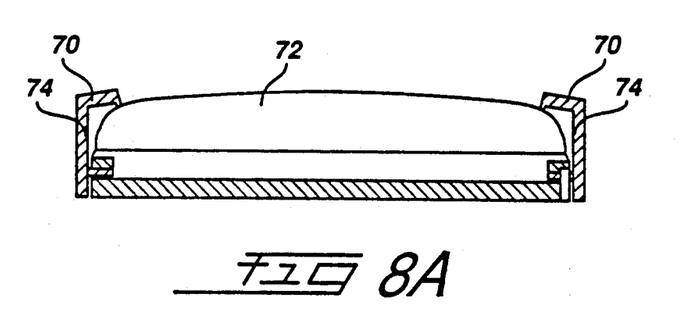
FIGS. 8A and 8B are top and front views, respectively, of the second embodiment of the present invention where the conducting traces are formed directly on the inside surface on the surrounding bezel of the cathode ray tube display.
Figure 8B:
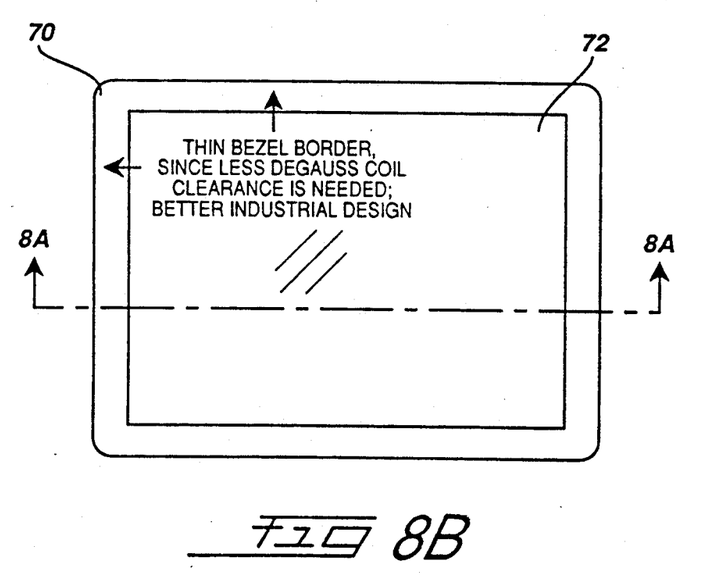

FIG. 8A and FIG. 8B show a second embodiment of the present invention whereby the conducting traces are printed on the inside surface of the bezel 70 rather than on a separate plastic substrate as shown in the earlier Figures. As printed circuit techniques become more efficient and are less destructive to the plastic upon which the conductive traces are plated, the conducting traces printed on the inside surface of the bezel become more economically and aesthetically attractive. At the present state of the art, the plating process for the conducting traces 74 of the bezel 70 could cause an etching effect on the outward surface of the bezel that a viewer actually sees, which would be unacceptable from an aesthetic viewpoint. However, aesthetics aside the conducting surfaces printed on the inside surface of the bezel rather than a plastic substrate separately shown in earlier Figures, would be just as effective in degaussing the shadow mask in the adjacent cathode ray tube 72. In this particular instance, the border 70 of the bezel can be even smaller than that shown in earlier Figures and certainly much smaller and narrower than in prior art degaussing coil techniques using discrete degaussing coils, due to the fact that no clearance is needed for any degaussing coils apart from the plated conductive surfaces seen in FIG. 8A. If the plated conducting traces are printed in a spiral indent in the inside surface of the surface of the bezel, then accidental scratches will have minimal effect in destroying a certain part of the conducting trace or possibly causing an open circuit in the conducting spiral surface. Printing the conductive traces in a spiral indent also allows for a conductor of greater cross section area to be formed, allowing for higher current densities, and a more effective degauss process, as described above.

There are standard plating techniques, that is, different ways of getting the actual artwork on the CRT bezel, or the plastic substrate, seen on some of earlier Figures. Plating is accomplished by first plating the area with a solid sheet of copper all around it. Then a photopolymer surface, which is basically a clear plastic skin, is fitted over the degauss coil. Using a laser to draw the areas on the coil that are to be etched away, and with the use of micropigment, the clear plastic skin turns dark in the areas impinged by the laser light. Underneath the clear layer is the copper layer over which is a photo resist surface, which is then exposed to an ultraviolet light. Light shines through the clear plastic skin except where it is blocked by the areas that had been impinged by the layer light. Thus the light shines through or not depending upon where the light and dark areas are that have been exposed to the laser. Then the skin is removed, the plastic substrate is inserted into an etch bath where the photo resist was exposed and the conductive traces are left after all the etching operations. This is very similar to the manufacture of a printer circuit board and uses prior art techniques, but in this instance for the plastic substrate it is done in three dimensions rather than in two dimensions.

Of course, if the bezel 70 itself has the conducting traces 74 printed on the inside surface, the plating technique would be similar; however, the baths in which the plating process is used could degrade the external surface of the bezel which could be unpleasing to a user's eye. As set forth above, in one embodiment the degauss coil is etched on the outside surfaces of a plastic substrate, while the other embodiment plates the inside surface of the cathode ray tube bezel. The part gets totally dipped in the etch solution to wash away the unwanted copper and leaves the desired conductive traces. It is as easy to put the conductor traces on all sides than it is to only put them on one side; that is, the inside of a cathode ray tube bezel, for example.

That is, in the second embodiment the traces are etched right on to the cathode ray tube bezel itself, but any plastic part that is plated gets a chalky appearance which, as set forth above, could be unpleasing to a user's eye. The first embodiment, however, plates onto a plastic part which is snapped into the bezel after the traces are plated on the plastic part. But in this embodiment traces can be placed on both sides of the plastic substrate, and is not seen by an operator or a human user and thus the chalky appearance of the plastic on the plastic substrate is irrelevant after it is snapped into place on the inside of the plastic cathode ray tube bezel.

While the invention has been described with reference to specific embodiments, it will be understood by those skilled in the art that various changes may be made and equivalents may be substituted for elements thereof without departing from the true spirit and scope of the invention. In addition, many modifications may be made without departing from the essential techniques of this invention.

I claim:

1. In a cathode ray tube display having a cathode ray tube and a display bezel, a degauss coil comprising:
   a substrate adjacent to the inner surface of said display bezel;
   a spiral pattern of conductive traces on said substrate forming a coil.

2. The degauss coil of claim 1 wherein said conductive traces are plated on said substrate.

3. The degauss coil of claim 1 wherein said conductive traces are etched on said substrate.

4. The degauss coil of claim 1 wherein said conductive traces are formed in recesses in said substrate.

5. In a cathode ray tube display having a cathode ray tube and a display bezel, a degauss coil comprising a spiral pattern of conductive traces formed on the inside surface of said display bezel.

6. The degauss coil of claim 5 wherein said conductive traces are plated on the inside surface of said display bezel.

7. The degauss coil of claim 5 wherein said conductive traces are etched on the inside surface of said display bezel.

8. The degauss coil of claim 5 wherein said conductive traces are formed in recesses on the inside surface of said display bezel.

9. A degauss coil for use in a cathode ray tube display comprising:
   a substrate adapted to be placed adjacent to the display surface of said cathode ray tube wherein said substrate surrounds the cathode ray tube immediately adjacent to the display face thereof and said substrate comprises a bezel supporting said cathode ray tube, a spiral pattern of conductive traces on said substrate forming a coil.

10. A degauss coil for use in a cathode ray tube display comprising:

a substrate adapted to be placed adjacent to the display surface of said cathode ray tube wherein said substrate surrounds the cathode ray tube immediately adjacent to the display face thereof and said substrate is mounted on a bezel supporting said cathode ray tube, a spiral pattern of conductive traces on said substrate forming a coil.

* * * * *